April 27, 1965 P. F. PFISTER ETAL 3,181,019
SELF-STARTING SYNCHRONOUS HYSTERESIS MOTOR
Filed Feb. 1, 1961

Inventors
Pierre F. Pfister
Kurt Ruebner
By Stevens, Davis, Miller & Mosher
Attorneys

3,181,019
SELF-STARTING SYNCHRONOUS HYSTERESIS MOTOR

Pierre F. Pfister and Kurt Ruebner, Sonceboz, Bern, Switzerland, assignors to Societe Industrielle de Sonceboz S.A.
Filed Feb. 1, 1961, Ser. No. 86,464
Claims priority, application Switzerland, Feb. 13, 1960, 1,620/60
3 Claims. (Cl. 310—156)

This invention relates to electric motors, and more particularly to self-starting electric motors of the synchronous type having a rotor arranged in a stator which produces a rotating field.

A main object of the invention is to provide a novel and improved self-starting synchronous motor of the above type which is simple in construction, which is economical to manufacture, and which has relatively high starting torque.

A further object of the invention is to provide an improved self-starting electric motor of the above type which employs a rotor having rings of sintered hysteretic and permanently magnetized material thereon.

Further objects and advantages of the invention will become apparent from the following description and claims, and from the accompanying drawings, wherein:

Previously proposed self-starting synchronous electric motors have comprised rotors consisting of asynchronous parts and synchronous parts axially displaced on a common shaft. In a typical rotor of this type, the asynchronous part comprises a steel disc which is sufficiently hardened to start as a hysteresis rotor. Upon starting, the permanently magnetized element, which forms the synchronous part, is repelled by the asynchronous part in order to maintain the starting torque; this expedient is necessary, since the starting torque developed by the steel disc is quite small.

It has furthermore been proposed to employ as a rotor in a hysteresis motor a sleeve of hysteretic material which surrounds a cylindrical core of good magnetic permeability. The outer sleeve becomes permanently magnetized to a greater or lesser extent, and north and south poles are produced on its periphery, whereby synchronous speeds of rotation can be obtained. However, a material having high hysteresis losses is relatively difficult to magnetize.

A main purpose of the present invention is to provide a self-starting synchronous motor having the highest possible torque upon starting and in operation, and having an extremely simple construction.

These objectives are achieved in the present invention by employing a rotor on which at least one ring of sintered hysteretic material is arranged coaxially with and adjacent to at least one ring of permanently magnetized sintered material on a drum of non-magnetic material.

The larger the hysteresis loop of a magnetic material is, the better suited is such a material for use in the rotor of a hysteresis motor. For the sake of brevity, those materials having a large hysteresis loop will hereinafter be called hysteretic materials. In using such a material in a hysteresis motor, the shape of its hysteresis loop and the location of the operating point on the hysteresis curve thereof are important factors.

Figure 1:
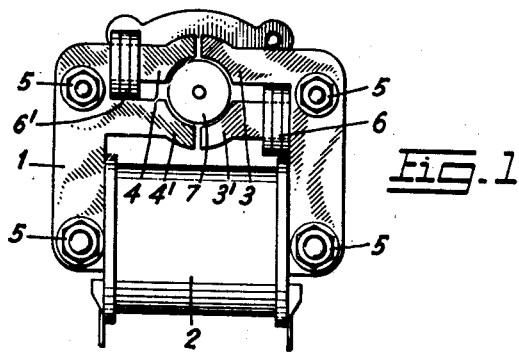
FIGURE 1 is an end elevational view of a single phase alternating current motor constructed in accordance with the present invention.

Referring to the drawings, FIGURE 1 shows a single phase, alternating current self-starting motor constructed in accordance with the present invention. The motor shown in FIGURE 1 has a C-shaped stator core 1 which consists of plates held together by screws 5 and which has mounted thereon the field coil 2 which is fed by single phase alternating current.

The stator core 1 is formed to define two pairs of pole pieces 3, 3' and 4, 4', which lie opposite each other and between which the rotor 7 is rotatably supported by suitable bearing means, not shown. On each of two opposite pole pieces belonging to different poles, namely, on the pole pieces 3' and 4 in FIGURE 1, there is respectively arranged a ring 6 and 6' of material which is a good conductor of electricity, but which is non-magnetic, such as copper or brass. This expedient, which in itself is known, makes it possible to create a rotating field between the pole pieces to drive the rotor 7. The magnetic alternating flux produced by the coil 2 in the stator core 1 induces in the rings 6 and 6' currents which are displaced in phase by 90° with respect to the feed current, and these currents in turn produce an alternating flux which is displaced in phase 90° with respect to the inducing alternating flux, whereby to produce two alternating fluxes which are displaced in time and position 90° with respect to each other, and which, as is known, provide a rotating field.

In all the following examples which are described in detail, the rotor is so constructed that upon starting it operates as a hysteresis rotor, while when synchronism is reached, it operates as a hysteresis and synchronous rotor.

Figure 2:
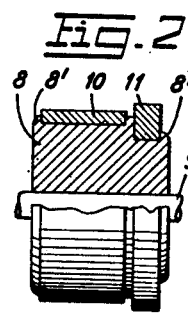
FIGURE 2 is an enlarged side elevational view, partly in vertical cross-section, of the rotor of the motor of FIGURE 1.
Figure 2A:
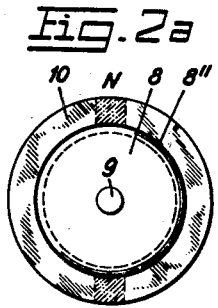
FIGURE 2a is an end elevational view of the rotor shown in FIGURE 2.

In the embodiment shown in FIGURES 2 and 2a, the rotor has a body 8 serving as a support, in which a shaft 9 is axially secured. This body 8 is preferably of light metal, such as aluminum or other light non-magnetic metal, but alternatively can be of a suitable rigid plastic composition.

On the rotor body 8 a ring 10 and a ring 11 are press-fitted on opposite sides of and against an annular rib 11', and are thereupon secured against displacement by the flanged end edges 8' and 8" respectively. The ring 10 consists of a hysteretic material, for example, of an iron-aluminum-nickel alloy with additions such as copper, titanium and cobalt. This ring is shaped by sintering. The ring 11 consists of a permanent magnet. This permanent magnet is of a material which is practically free of eddy currents and is also formed by sintering.

It follows from the above that the rotor has two elements which act differently electrically. The first element consists of the ring 10 and operates as the hysteresis rotor of a hysteresis motor, while the second element consists of the permanent magnet 11 and operates as the rotor of a synchronous motor. Upon starting, the hysteretic torque starts the rotor in a known manner. In synchronous operation, the permanent-magnet ring 11 is carried along by the rotating field, and in this way the operating torque is developed by both rings.

Figure 3:
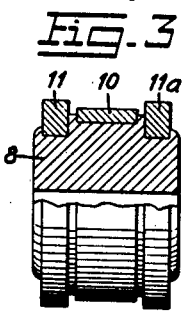
FIGURE 3 is a side elevational view, partly in vertical cross-section, of a modified form of rotor according to this invention.

In the modification shown in FIGURE 3, there are arranged in sequence on the rotary body 8 a first permanent magnet ring 11 as one element, a ring 10 consisting of hysteretic material as the other element, and a permanent magnet ring 11a, the poles of which are aligned with those of the permanent magnet ring 11.

Figure 4:
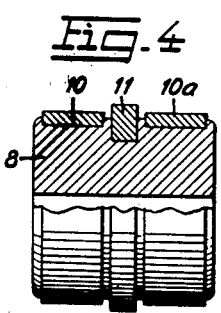
FIGURE 4 is a side elevational view, partly in vertical cross-section, of a further modified form of rotor according to the present invention.

In the modification shown in FIGURE 4, there are arranged in sequence on the rotor body 8 a first ring 10 consisting of hysteretic material, a permanent magnet ring 11, and a second ring 10a consisting of hysteretic material.

Figure 5:
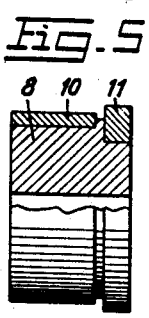
FIGURES 5, 6 and 7 are side elevational views, partly in vertical cross-section, of still further modified forms of rotors according to the present invention.
Figure 6:
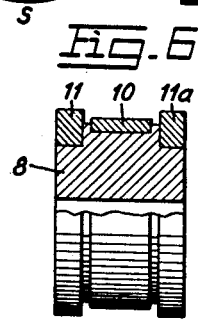
Figure 7:
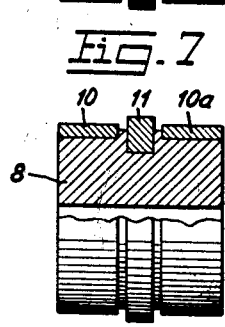
Figure 8:
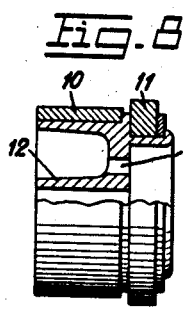
FIGURE 8 is a side elevational view, partly in vertical cross-section, of a further modified form of rotor for a single phase self-starting motor according to the present invention.
Figure 8A:
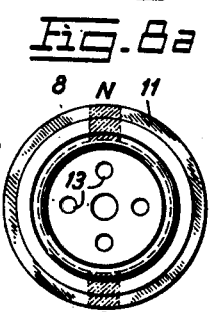
FIGURE 8a is an end elevational view of the rotor of FIGURE 8.
Figure 9:
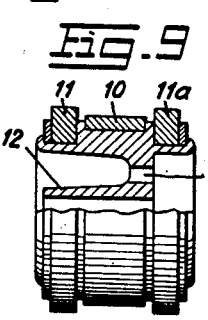
FIGURES 9 and 10 are side elevational views, partly in vertical cross-section, of further modified forms of rotors according to the present invention.
Figure 10:
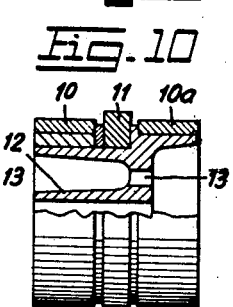

FIGURES 5, 6 and 7 show embodiments which correspond respectively to the embodiments shown in FIGURES 2, 3 and 4. However, in these embodiments, the rings 10 and 11, and 11a and 10a, are merely press-fitted onto the rotor body 8. The rotor body 8 does not have any flanged end edges.

In the embodiments shown in FIGURES 8, 8a, 9 and 10, the rotor has a body serving as a support, said body having a hub 12 serving for its attachment to a shaft, and holes 13 at equal radial distances are formed in the body to reduce its weight. This body is preferably made of light non-magnetic material such as aluminum, or other non-magnetic metal, but alternatively could be made of a suitable rigid plastic composition. The arrangement of the rings 10, 11, 11a and 10a in FIGURES 8, 8a, 9 and 10 corresponds to the arrangement in FIGURES 2, 2a, 3 and 4 respectively.

Although mention has been made above only of self-starting synchronous motors which are fed with single phase current, the rotors described could also be used in connection with motors of the same type which are fed with polyphase alternating current.

While certain specific embodiments of improved self-starting synchronous motors have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A self-starting synchronous motor comprising a stator having a pair of poles, means to produce a rotating magnetic field between said poles, and a rotor rotatably mounted between said poles, said rotor comprising a supporting body, a plurality of spaced coaxial rings press-fitted on said body, said rings comprising at least a first ring of sintered hysteretic material and a second ring of sintered permanently magnetized material adjacent said first ring, abutment means on said body between the adjacent rings, and retaining flange means on said body engaging the outer edges of the rings.

2. A self-starting synchronous motor comprising a stator having a pair of poles, means to produce a rotating magnetic field between said poles, and a rotor rotatably mounted between said poles, said rotor comprising a supporting body formed at its intermediate portion with a circumferential rib, a ring of sintered hysteretic material press-fitted on said body and disposed adjacent one side of said rib, and a ring of permanently magnetized sintered material press-fitted on said body and disposed adjacent the other side of said rib.

3. A self-starting synchronous motor comprising a stator having a pair of poles, means to produce a rotating magnetic field between said poles, and a rotor rotatably mounted between said poles, said rotor comprising a supporting body formed at its intermediate portion with a circumferential rib, a ring of sintered hysteretic material press-fitted on said body and disposed adjacent one side of said rib, a ring of permanently magnetized sintered material press-fitted on said body and disposed adjacent the other side of said rib, and respective retaining flanges on said body adjacent the outer edges of the rings.

References Cited by the Examiner
UNITED STATES PATENTS

| 2,214,850 | 9/40 | Arey | 310—163 |
|---|---|---|---|
| 2,547,599 | 4/51 | Roters | 310—162 |
| 2,721,278 | 10/55 | Baumann | 310—44 X |
| 2,775,716 | 12/56 | Valeton et al. | 310—156 |
| 2,784,331 | 3/57 | Rodemann | 370—156 |
| 2,810,085 | 10/57 | Akeley | 310—162 |
| 2,897,384 | 7/59 | Muller | 310—44 X |
| 2,913,819 | 11/59 | Andreatti | 310—44 X |
| 3,078,381 | 2/63 | Volkrodt | 310—156 |

OTHER REFERENCES

Metals Handbook, American Society for Metals, vol. 1, 8th ed., p. 782.

MILTON O. HIRSHFIELD, *Primary Examiner.*